United States Patent
Daly et al.

(10) Patent No.: US 8,202,661 B2
(45) Date of Patent: Jun. 19, 2012

(54) METHOD AND SYSTEM FOR RECOVERING HIGH POWER OUTPUT OPERATION OF HIGH TEMPERATURE FUEL CELLS USING A RAPID LOAD RECOVERY PROCEDURE

(75) Inventors: Joseph Daly, Bethel, CT (US); William Livingood, Niskayuna, NY (US); Ramakrishnan Venkataraman, New Milford, CT (US); Mohammad Farooque, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 1430 days.

(21) Appl. No.: 11/475,475

(22) Filed: Jun. 27, 2006

(65) Prior Publication Data

US 2007/0298295 A1 Dec. 27, 2007

(51) Int. Cl.
*H01M 8/04* (2006.01)
(52) U.S. Cl. .......................... 429/430; 429/400; 429/428
(58) Field of Classification Search ................... 429/13, 429/428
See application file for complete search history.

(56) References Cited

U.S. PATENT DOCUMENTS

| | | | |
|---|---|---|---|
| 5,761,895 A | 6/1998 | Chu et al. | |
| 6,127,057 A * | 10/2000 | Gorman | 429/429 |
| 6,495,277 B1 | 12/2002 | Edlund et al. | |
| 2002/0192513 A1 * | 12/2002 | Colbow et al. | 429/13 |
| 2003/0031899 A1 * | 2/2003 | Margiott et al. | 429/13 |
| 2003/0180583 A1 * | 9/2003 | Ichikawa et al. | 429/9 |
| 2004/0005487 A1 * | 1/2004 | Matoba | 429/22 |
| 2004/0146762 A1 * | 7/2004 | Simpson et al. | 429/22 |
| 2005/0014039 A1 | 1/2005 | Rolf | |
| 2005/0123821 A1 * | 6/2005 | Al-Qattan et al. | 429/38 |
| 2006/0046107 A1 | 3/2006 | Lindsey | |

* cited by examiner

*Primary Examiner* — Ula C Ruddock
*Assistant Examiner* — Patricia Davis
(74) *Attorney, Agent, or Firm* — Cowan, Liebowitz & Latman, P.C.

(57) ABSTRACT

A fuel cell system for receiving input fuel, input water and input oxidant comprising a humidifying assembly for combining the input fuel with input water to produce humidified fuel, a fuel cell having an anode for receiving the humidified fuel and a cathode for receiving the input oxidant, and a power load controller for controlling a power load on the fuel cell system based on a power output set point and changes in the detected load. If the load drops from a high load to a low load and ability to ramp to a high target power output is thereafter restored, the controller is adapted to perform a rapid load recovery procedure by controlling the power output of the fuel cell system to increase from a power output corresponding to the low load to the high target power output corresponding to the high load at a first predetermined rate if all of one or more predetermined conditions are satisfied, and is also adapted to perform a standard load recovery procedure by controlling the power output to increase at a second predetermined rate which is lower than the first predetermined rate, if at least one predetermined condition is not satisfied.

11 Claims, 4 Drawing Sheets

METHOD AND SYSTEM FOR RECOVERING HIGH POWER OUTPUT OPERATION OF HIGH TEMPERATURE FUEL CELLS USING A RAPID LOAD RECOVERY PROCEDURE

BACKGROUND OF THE INVENTION

This invention relates to fuel cells and, in particular, to a method of power load recovery in fuel cell systems.

A fuel cell is a device which directly converts chemical energy stored in hydrocarbon fuel into electrical energy by means of an electrochemical reaction. Generally, a fuel cell comprises an anode and a cathode separated by an electrolyte, which serves to conduct electrically charged ions. In order to produce a useful power level, a number of individual fuel cells are stacked in series with an electrically conductive separator plate between each cell.

Fuel cells operate by passing a reactant fuel gas through the anode, while oxidizing gas is passed through the cathode. The electrical output of the fuel cell system depends in part on the rates at which humidified fuel gas and the oxidizing gas are supplied to, and are carried through, the anode and the cathode, respectively. In order to increase or ramp the power output of the fuel cell system from a low load to a high load corresponding to a high target power output, the rates at which the humidified fuel gas and the oxidant gas are supplied to the fuel cell system are correspondingly increased.

High temperature fuel cell systems, such as molten carbonate fuel cells ("MCFCs) and solid oxide fuel cells ("SOFCs"), are capable of operating at high power outputs of about 250 kW or higher. However, when the power output or load on the fuel cell system changes, the thermal profile of the system is also caused to change in response to the changing electrochemical reaction rates, imposing thermal and mechanical stresses on the fuel cell stack. In order to maintain a relatively constant thermal profile within the fuel cell stack and to minimize thermal-mechanical stresses on the stack, increases in the power output and thus the load on the system typically must be made at a slow and controlled rate. For example, the power output for a MCFC system operating at a low load is typically increased at a rate of 0.5 kW/min until the system reaches the high target power output. As a result, a fuel cell system requires a significant amount of time in order to reach high load operating conditions without causing harm the fuel cell stack.

In certain circumstances, a fuel cell system operating at high load conditions may suddenly drop from the high load to a low load. Such sudden drop in the load and thus the power output may be caused by a short term grid disruption in which the fuel cell system connected to a power grid becomes separated from the grid, thus eliminating the load source created by the grid and reducing the load on the system to an island load. In other cases, the sudden drop in the power output is commanded by a controller to allow a process change, such as fuel switching, or to address a failure of a system component. This sudden commanded drop in power output may result in a low load condition or a zero load condition.

Upon the return of the system's ability to ramp to a high load, the conventional method is to increase, or ramp, the power output of the fuel cell at a slow gradual rate from the low load to the high load, terminating at the high target power output. The high target power output is usually equivalent to the previous high load. The conventional method requires a significant amount of time, and therefore results in a considerable reduction in the system's electrical output and efficiency. Accordingly, a rapid recovery of the load to allow the fuel cell system to quickly return to a high load operating conditions after the disruption without causing harm to the fuel cell stack is desired.

It is therefore an object of this invention to provide a method for rapid recovery of high load conditions in the fuel cell system after a momentary drop of the load from high to low.

It is a further object of the invention to provide a method for rapid load recovery that minimizes thermal and mechanical stresses on the fuel cell stack and does not result in damage to the stack.

SUMMARY OF THE INVENTION

The above and other objectives are realized in a fuel cell system having a fuel cell and a power load controller for controlling a power output of the fuel cell system. The power load controller is adapted to perform a load recovery procedure if the load drops from a high load to a low load and the ability to ramp to a high target power output is thereafter restored. The high target power output is substantially equal or close to the high load before the drop from the high load to the low load. Particularly, the controller is adapted to perform a rapid load recovery procedure by controlling the power output of the fuel cell system to increase from a power output corresponding to the low load to the high target power output corresponding to the high load at a first predetermined rate if all of one or more predetermined conditions are satisfied, and is adapted to perform a standard load recovery procedure by controlling the power output to increase to the power output corresponding to the high target power output at a second predetermined rate that is lower than the first predetermined rate if at least one of the predetermined conditions is not satisfied. The high load is at least 10 kW greater than the low load and the load drop from the high load to the low load is an instantaneous load drop over a time period of 10 seconds or less.

In some illustrative embodiments, the fuel cell system receives input fuel, input water and input oxidant and further comprises a humidifying assembly for combining the input fuel with water to produce humidified fuel. The controller controls the power output of the fuel cell system by controlling the flow rates of at least the input fuel and the input water, wherein the flow rates of the input fuel and water are controlled such that the carbon to steam ratio is constant during the performing of the rapid load recovery procedure. In some embodiments, the controller also controls the flow rate of the input oxidant to the system.

In some illustrative embodiments, the predetermined conditions for performing the rapid load recovery procedure include a first condition that a time period elapsed between the dropping of the load from the high load to the low load and the restoration of the ability to ramp to the high target power output is equal to or less than a first predetermined period and a second condition that a time period elapsed since completion of a preceding rapid load recovery procedure is equal to or greater than a second predetermined time period. An example of a first predetermined time period is 15 minutes and a second predetermined time period is 90 minutes. Examples of first and second predetermined rates are 50 kW/min and 0.5 kW/min, respectively. In some cases, the predetermined conditions further include a third condition that no power alarms in the fuel cell system are activated.

In some illustrative embodiments of the fuel cell system, the fuel cell system is connected to a power grid, and the load on the system is set by the controller. In other embodiments, the fuel cell system is independent of a power grid and the load is determined by one or more power consumption devices connected to the fuel cell system.

A method of operating a fuel cell system provided with an input fuel, an input water and an input oxidant and comprising a humidifying assembly and a fuel cell having an anode and a cathode, is also described.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
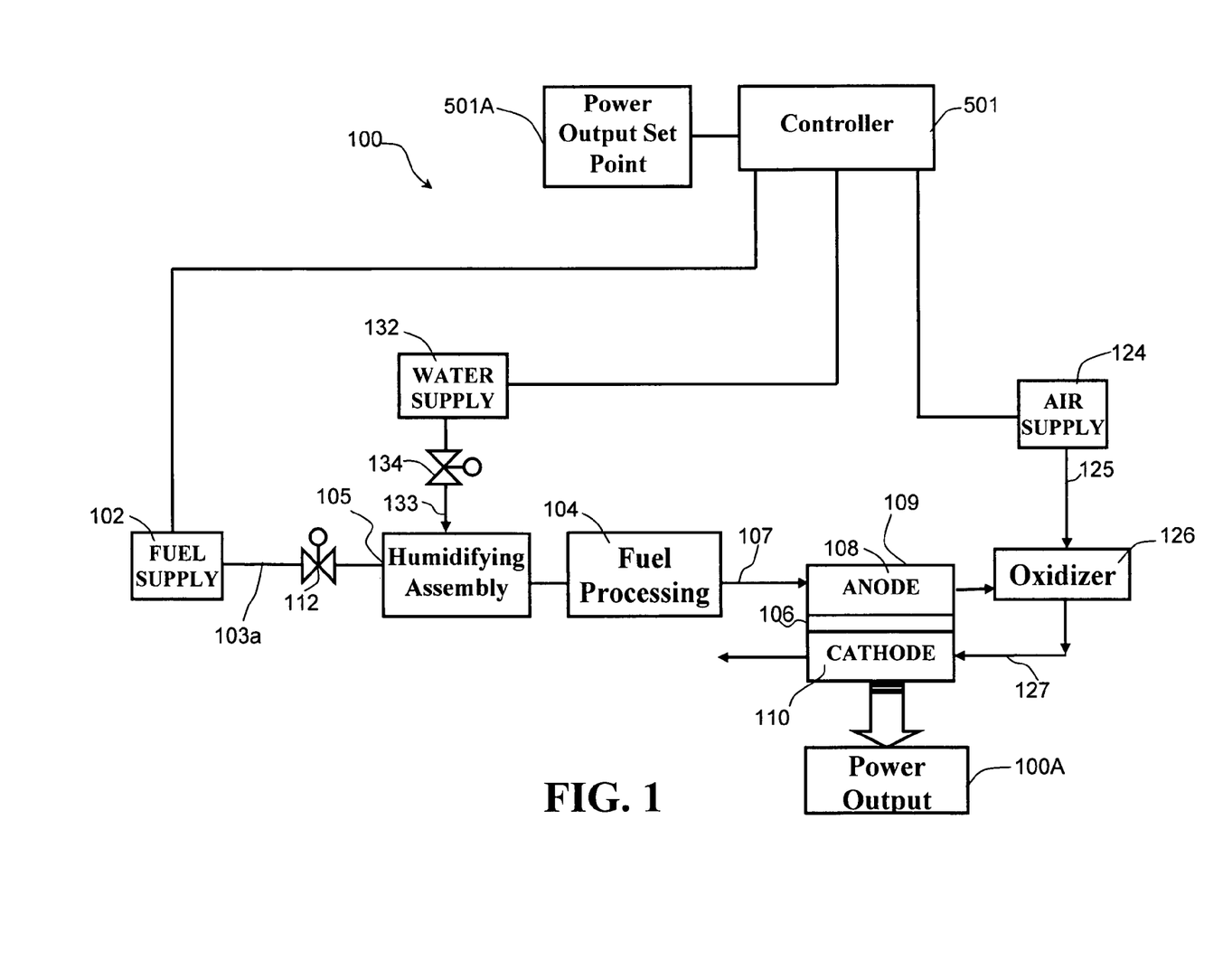
FIG. 1 shows a fuel cell system employing a load control assembly for controlling power output of the system and for performing rapid load recovery.

FIG. 1 shows a fuel cell system 100. The fuel cell system 100 includes a power load controller 501 for determining a load and changes in the load from time to time and controlling the power output 100A of the fuel cell system 100 during the system's operation in accordance with a power output set point 501A, the determined load on the system 100 and changes in the load. The power output set point is a moving set point which is adjusted by the controller based on the determined load and changes in the load and corresponds to the desired power output from the fuel cell system 100 at a given time while the power plant is grid connect, and corresponds to the actual power output while the power plant is in island mode or grid disconnected. In particular, the controller 501 controls the power output 100A of the system 100 by controlling the flow rates of at least an input fuel from a fuel supply 102 and an input water from a water supply 132 to the system 100 based on the power output set point 501A. As can be appreciated, the rates at which the input fuel and the input water are supplied to the system 100 determine the allowable amount of electric power outputted by the fuel cell system as well as the steam to carbon ratio of the fuel supplied to a fuel cell 109 of the system 100, and it is desired that the flow rates of the fuel and water are such that the electric power outputted by the system satisfies the power output set point. In some embodiments, the controller 501 also controls the flow rate of input air from an air supply 124 to the system 100 and the operating temperature in the system 100 by varying the fuel, water and air flow rates.

As shown in FIG. 1, the fuel cell system 100 also includes a humidifying assembly 105 which receives and combines the input fuel and the input water so as to sufficiently humidify the fuel for use in the fuel cell 109. In the illustrative embodiment shown, the humidifying assembly 105 comprises a mixer, which receives and combines the input fuel and water to produce humidified fuel, and a heat exchanger which pre-heats the humidified fuel to a predetermined temperature. As shown, the humidifying assembly 105 receives the input fuel from the fuel supply 102 through a connecting line 103a and a valve 112, and the input water from the water supply 132 via a connecting line 133 and a valve 134. In the mixer of the humidifying assembly 105, fuel and water are mixed to produce humidified fuel, and heated to the predetermined temperature.

The fuel cell system 100 in FIG. 1 further includes a fuel processing assembly 104, which receives, cleans and further processes the pre-heated humidified fuel. The processing assembly 104 may include a deoxidizer unit and/or a pre-reformer unit. After undergoing processing in the processing assembly 104, the fuel is conveyed through a connecting line 107 to a fuel cell anode 108 of the fuel cell 109, where it reacts with oxidant gas passing through a fuel cell cathode 110 of the fuel cell 109 to produce electrical power output. Oxidant gas inputted to the cathode 110 is produced in an oxidizer 126, which receives and mixes input air from the air supply 124 and anode exhaust gas comprising unspent fuel from the fuel cell anode 108, and combusts the input air and the unspent fuel to produce heated oxidant gas suitable for use in the cathode 110.

As mentioned above and shown in FIG. 1, the input fuel flow rate from the fuel supply 102 and the input water flow rate from the water supply 132 are controlled by the power load controller 501 of the load control assembly 101 based on the power output set point and any changes in the power output set point, such as for example when ramping to a new high target power output. The operation of the power load controller 501 is schematically illustrated in the chart shown in FIG. 2.

Figure 2:
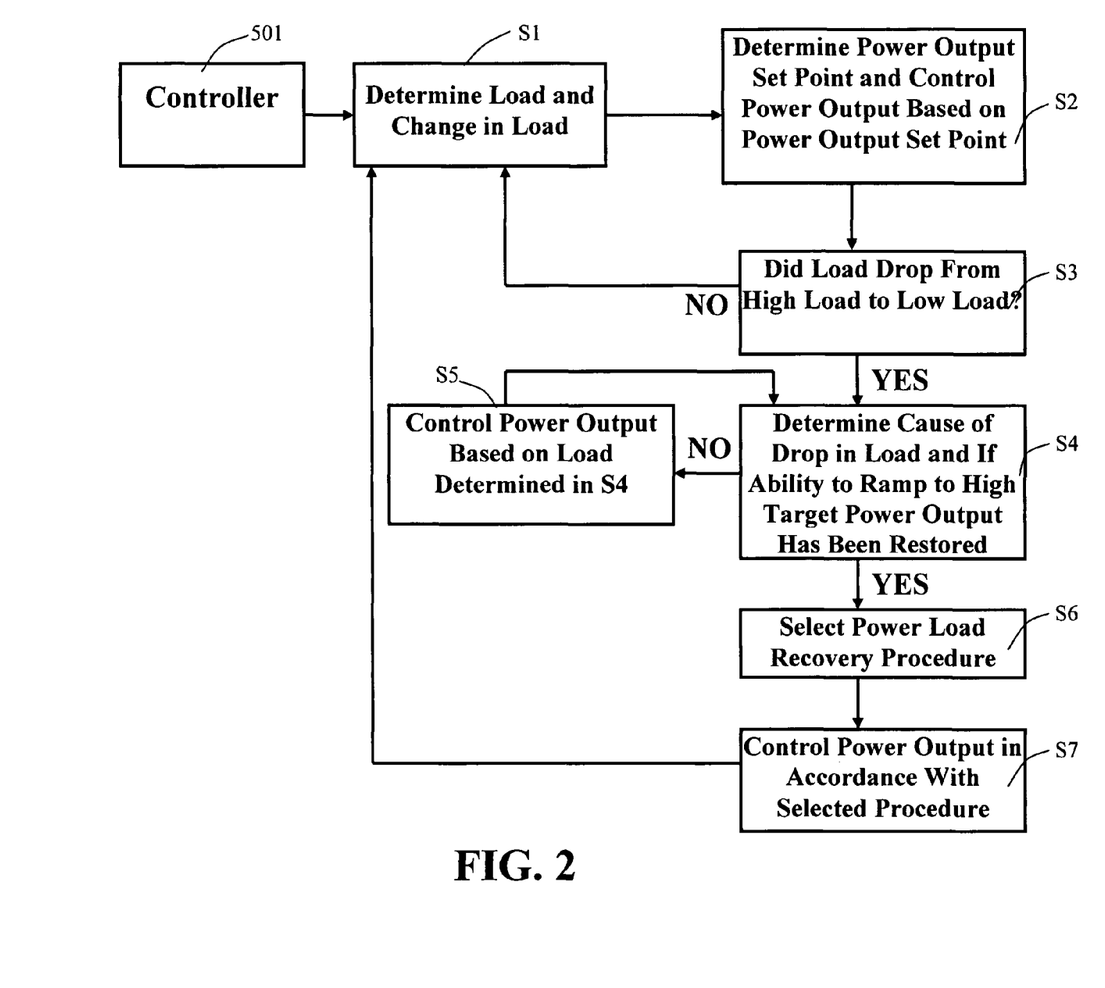
FIG. 2 shows a flow chart of operations of a controller of the load control assembly of FIG. 1.

As shown in FIG. 2, the power load controller 501 determines in a first step S1 the electric load on the system 100 and/or any change in the load relative to a previous determination of the load. As can be appreciated, if the fuel cell system 100 is connected to a power grid, the load can be driven to any predetermined set point or fluctuated as desired because the grid, which supplies a stable and constant voltage, is capable of absorbing a full load from the fuel cell system. When the fuel cell system 100 is not connected to a power grid, the load is determined by an "island load," which is a load connected to and receiving electrical power from the fuel cell system 100. Based on the determination in the first step S1, the controller 501 determines the power output set point and controls the power output of the system in a second step S2 by controlling the input fuel and input water flow rates such that sufficient electrical power is outputted by the system 100 to satisfy the power output set point. If the fuel cell system is not connected to a power grid, the power output set point is set equivalent to the island load such that the island load requirements are satisfied.

As shown in FIG. 2, the controller 501 then proceeds to a third step S3, in which the controller determines, based on the determination in the first step S1, whether an instantaneous drop in the power output from a high load to a low load has occurred. In this illustrative embodiment, the high load is relative to the low load such that the high load is at least 10 kW greater than the low load. Therefore, the instantaneous drop in the power output is a drop of at least 10 kW which occurs over a time period of 10 seconds or less. As mentioned herein above, the instantaneous drop in the power output from high load to low load may occur due to the system disconnecting from the power grid, such that the load becomes the "island load." Otherwise, while the system maintains grid connection the instantaneous drop in load could be due to a change is power output set point to immediately drop load to facilitate a system change that must be performed at low or no load, for example to swap fuels, or due to a failure of a system component. If the controller 501 determines in step S3 that the power output is substantially constant and that no instantaneous drop in the power output from a high to a low load has occurred, then the controller 501 returns to the first step S1 and then to step S2 to continue monitoring the load and change in the load and to control the power output of the system by controlling the input fuel and input water flow rates in accordance with the power output set point determined in the second step S2.

If, in the third step S3, the power load controller determines that the power output has instantaneously dropped from a high load to a low load, then the controller 501 proceeds to a fourth step S4 in which the controller determines the cause of the drop in load and whether the ability of the system to ramp to a high target power output has been restored. The high target power output is the desired power output at high load conditions, which is substantially the same or close to the high load conditions preceding the instantaneous drop in the power output. For example, when the instantaneous drop in power output is caused by disconnecting from the power grid, the ability to ramp to a high target power output is restored upon reconnecting of the system to the power grid. In another example, when the instantaneous drop in power output from high load to low load is commanded by the controller, for example to facilitate a no-load fuel swap, the ability to ramp the power output is restored upon completion of the no-load fuel swap.

If the controller determines in step S4 that the ability to ramp to a high target power output has not been restored, then the controller's operation proceeds to step S5 to control the system's power output by controlling the input fuel and input water flow rates based on the load determined in step S4. Following step S5, the controller's operation returns to step S4 to again determine the load and whether the ability to ramp to a high target power output has been restored. If it is again determined in S4 that the ability to ramp to a high target power output has not been restored, the controller continues to monitor the ability to ramp to a high target power output and to control the power output of the system based on the determined load (steps S4 and S5) until it is determined in step S4 that the ability to ramp to a high target power output has been restored.

If the controller 501 determines in the fourth step S4 that the ability to ramp to a high power output has been restored, the operation of the controller's operation proceeds to step S6 in which the controller 501 selects an appropriate power load recovery procedure which is then used to increase, or ramp, the power output set point, and thus the power output, of the fuel cell system 100 until the power output is sufficiently high to satisfy the high target power output. In particular, the controller 501 determines in step S6 whether a standard load recovery procedure or a rapid load recovery procedure is to be used for recovering the system's high-power output operation. After the appropriate load recovery procedure is selected in step S6, the controller's operation proceeds to step S7 to control the ramping of the power output of the system in accordance with the load recovery procedure selected in S6 until the high target power output operation of the system is restored. As mentioned herein above, the power output of the system is controlled by controlling the flow rates of the input fuel and the input water to the fuel cell system. When the appropriate load recovery procedure is completed, i.e. the power output of the system is sufficient to satisfy the high target power output, the operation of the controller 501 returns to the first step S1.

As mentioned herein above, the standard, or conventional, load recovery procedure requires a slow gradual increase in the power output of the fuel cell system until the power output is sufficient to satisfy the high target power output on the system so as to avoid damage to the system due to thermal and mechanical stresses. When the standard load recovery procedure is employed, the controller 501 controls the input fuel and input water flow rates so that the power output of the system increases in accordance with the ramping of the power output set point at a standard predetermined rate. The standard predetermined rate is sufficiently slow so as to avoid damage to the fuel cell system. For example, a rate of about 0.5 kW/min can be used when ramping the power output set point of the fuel cell system during the standard load recovery procedure.

Under certain conditions, however, the rapid load recovery procedure may be employed to increase the power output of the system from a low power output to a high power output sufficient to satisfy the high target power output at a significantly higher rate. When the required conditions are satisfied and the rapid load recovery is employed, the controller 501 controls the flow rates of the input fuel and input water to the system such that the power output is increased at a rapid load recovery ("RLR") predetermined rate, which is higher than the standard predetermined rate, until the power output is sufficient to satisfy the high target power output. For example, the power output of the fuel cell system may be increased by increasing the power output set point at the RLR rate of about 50 kW/min during the rapid load recovery procedure. The use of the rapid load recovery procedure allows the system to reach high load operation to satisfy the high target power output in a significantly shorter period of time as compared to the standard load recovery procedure.

As a consequence of increasing the power output of the system at a high rate, such as the RLR predetermined rate, the ratio of fuel to water in the system may be caused to rapidly decrease in relation to the residence time of the fuel in the fuel path to the anode 108. This, in turn, causes the fuel diluted with steam to advance too slowly into the fuel cell anode 108, thus negatively affecting the electrical output and the overall performance of the system. Accordingly, as will be more fully discussed below, the flow rates of the input fuel and water supplied to the system during the performance of the rapid load recovery procedure need to be controlled such that the carbon to steam ratio of the fuel remains constant while the power output of the system is being increased in order to ensure that the fuel is conveyed to the fuel cell anode at a required rate.

Figure 3:
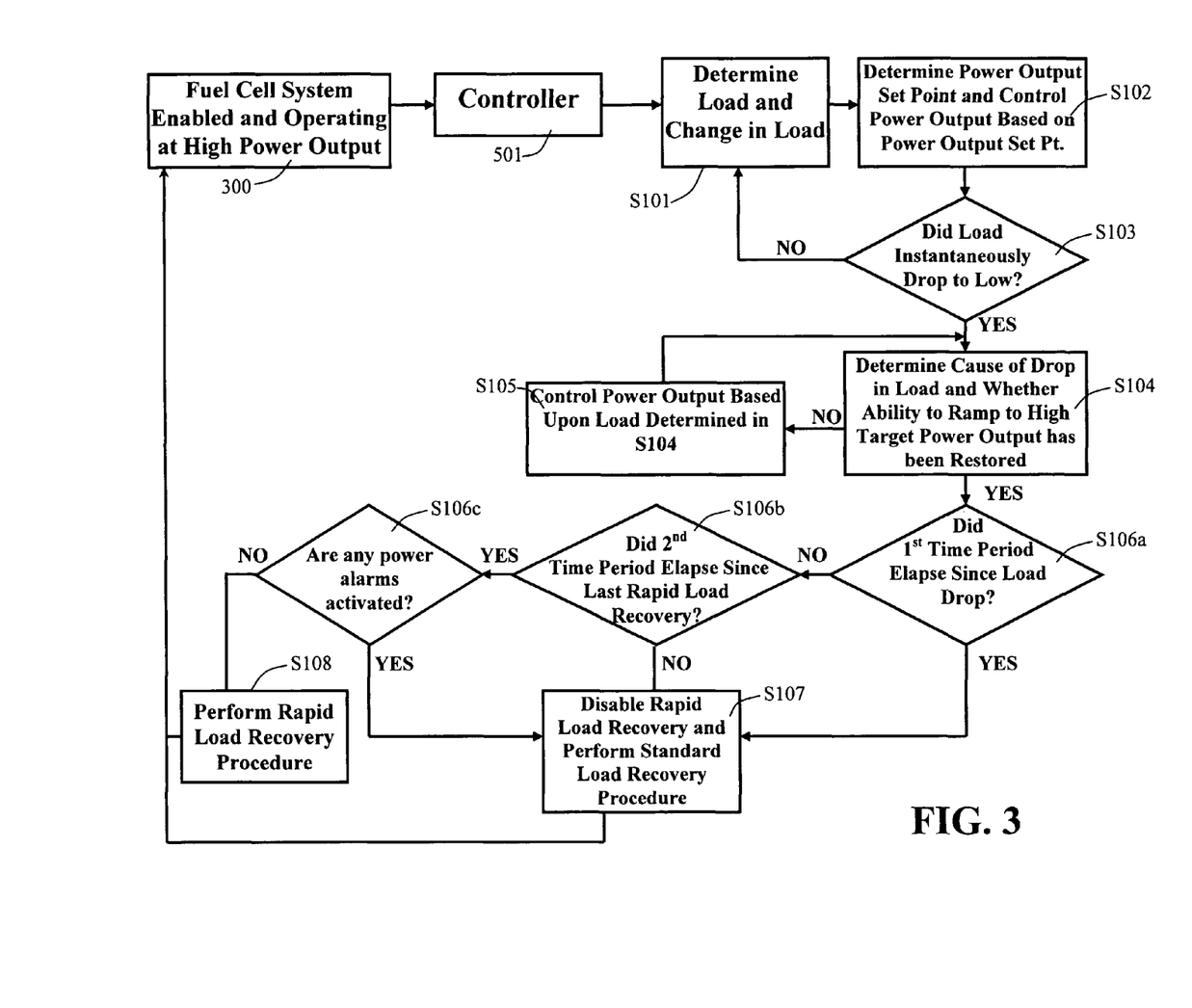
FIG. 3 shows a flow chart of operations of the controller of the load control assembly of FIG. 1 in selecting an appropriate load recovery procedure.

The conditions required for the rapid load recovery procedure to be employed are further discussed in detail with reference to FIG. 3, which shows a chart of logic operations of the controller 501 in selecting the load recovery procedure to be used after the high power demand is restored. As discussed above with respect to FIG. 2, the load recovery procedure is performed if the power output instantaneously drops from a high load to a low load and thereafter the ability of the system to ramp to a high target power output is restored. Accordingly, the operations of the controller 501 shown in FIG. 3 start with the fuel cell system 100 being enabled and operating at a high power output 300.

In a first step S101 of operation of the controller 501 during the high power output operation of the system 100, the controller 501 determines the load and the change in the load. As mentioned herein above, the load on the system can be set or adjusted as desired if the system is connected to the grid, or is determined by the "island load" if the system is not connected to the grid. In the next step S102, the controller 501 determines the power output set point based on the load and change in the load determined in S101, and controls the power output of the system by controlling the input fuel and input water flow rates based on the power output set point. The operation of the controller 501 thereafter proceeds to a third step S103 in which the controller determines whether the power output instantaneously dropped from a high load to a low load. If it is determined in step S103 that the power output did not instantaneously drop, then the operation of the controller returns to the first step S101.

If, however, it is determined in step S103 that the power output instantaneously dropped from a high to a low load, then the operation of the controller proceeds to step S104 in which the controller determines the cause of the drop in load and whether the ability of the system to ramp to a high target power output has been restored. As mentioned herein above, the high target power output is substantially equivalent or close to the power output before the instantaneous drop in the power output from the high load to the low load. If in step S104 the controller 501 determines that the ability to ramp to the high target power output has not been restored, the controller's operation proceeds to step S105 in which the power output set point is determined based on the load determined in S104 and the power output of the system is controlled by controlling the inlet fuel and water flow rates to the system based on the power output set point, and thereafter returns to step S104. As discussed above, the controller 501 continues monitoring the load and controlling the power output set point and the power output of the system by controlling the inlet fuel and water flow rates based on the detected load until it is determined in step S104 that the ability to ramp to the high target power output has been restored.

If the controller 501 determines in step S104 that the ability to ramp to the high target power output has been restored, then the operation of the controller 501 proceeds to step S106a in which the controller 501 determines whether a predetermined time period equal to a first predetermined time period has elapsed since the determination of the instantaneous drop in the power output from the high load to the low load. The first predetermined time period may vary depending on a variety of factors, including the size and type of the fuel cell system. For example, the first predetermined time period for a 250 kW direct-reforming molten carbonate fuel cell system is about 15 minutes. If it is determined in step S106a that the first predetermined time period since the instantaneous drop in power output has elapsed, then the operation of the controller proceeds to step S107 to disable the rapid load recovery procedure and to select the standard load recovery procedure. As mentioned herein above, the standard load recovery procedure is performed by slowly and gradually increasing the power output set point, and thus slowly and gradually increasing the power output of the system 100 in accordance with the power output set point by controlling the flow rates of the input fuel and input water, until the power output is equivalent to the restored high target power output.

If the controller 501 determines in step S106a that the first predetermined time period since the instantaneous drop in the power output has not yet elapsed, then the controller's operation proceeds to step S106b, in which the controller 501 determines whether sufficient time has passed since the last time rapid load recovery procedure had been used. In particular, the controller 501 determines in S106b whether a predetermined time period equal to a second time period has elapsed since the completion of the preceding rapid load recovery procedure. Like the first predetermined time period, the second predetermined time period also varies depending on the type and size of the fuel cell system used. For example, when a 250 kW direct-reforming molten carbonate fuel cell system is employed, the second predetermined time period is equal to 90 minutes.

If the controller 501 determines in step S106b that the second predetermined time period since the completion of the preceding rapid load recovery procedure has not elapsed, then the controller's operation proceeds to step S107 to disable the rapid load recovery procedure and to select the standard load recovery procedure. If the controller 501 determines in S106b that the second predetermined time period has elapsed, then the controller 501 proceeds to step S106c in which the controller 501 senses whether any pre-selected power alarms have been activated. In certain cases, the pre-selected power alarms comprise all power alarms in the fuel cell system 100, while in other cases, the pre-selected power alarms comprise only those power alarms that would have a negative effect on the system's performance during the rapid load recovery procedure. If the controller 501 senses that one or more pre-selected power alarms have been activated, then the controller's operation proceeds to step S107 to select the standard load recovery procedure. However, if the controller 501 confirms that no pre-selected power alarms have been activated, then the controller's operation proceeds to step S108 to select the rapid load recovery procedure for recovering the high power output operation of the fuel cell system.

As discussed above, when the rapid load recovery procedure is selected, the power output of the fuel cell system is increased in accordance with the power output set point at a significantly higher rate than when the standard load recovery procedure is used. In certain embodiments, the power output set point, and thus the power output of the system, is increased at a rate of about 50 kW/min, which is 100 times faster than the rate used in the standard load recovery procedure. During the rapid load recovery performance, the flow rates of the input fuel and the input water are controlled so as to increase the power output of the system in accordance with the power output set point, which is ramped at the RLR predetermined rate. In addition, the controller controls the fuel and water flow rates so that the carbon to steam ratio of the fuel remains constant while the rapid load recovery procedure is being performed in order to ensure that the humidified fuel is conveyed to the fuel cell anode at the required rate. For example, when a 250 kW direct-reforming fuel cell system is used, the controller 501 controls the input fuel and water flow rates so that the carbon to steam ratio remains at about 2.0.

As discussed herein above, the load recovery procedure is performed until the power output of the fuel cell system is sufficient to satisfy the high target power output as determined in step S104. When the power output becomes sufficient to satisfy the high target power output, the load recovery procedure is completed, the fuel cell system is enabled and operating at high power output 300 and the operation of the controller 501 then returns to the first step S101.

Figure 4:
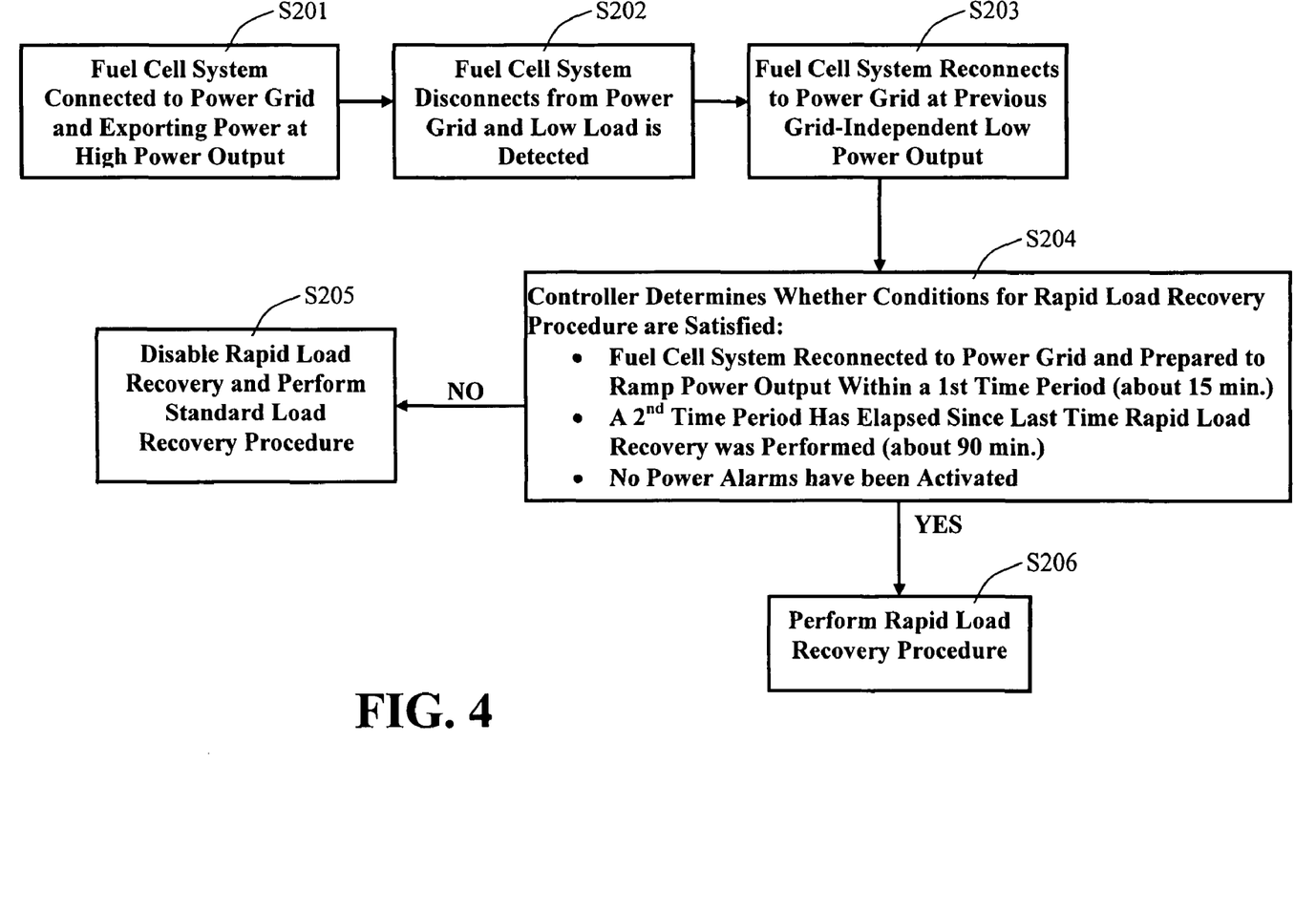
FIG. 4 shows a chart of operations of the fuel cell system of FIG. 1 operating on a power grid, after temporary disconnection of the system from the power grid.

The rapid load recovery procedure is particularly useful in fuel cell systems that are connected to a power grid, which allows the value for the power output on the fuel cell system to be pre-set. As mentioned above, when a temporary grid disruption occurs, the fuel cell system 100 may be caused to temporarily disconnect from the power grid, resulting in an instantaneous drop in the power output to the island load, and to reconnect to the grid, resulting in the restoration of the ability to ramp to a high target power output, after a short period of time. In such situations, the rapid load recovery procedure is typically appropriate to allow quick recovery of the power output of the system after the system reconnects to the power grid and the ability to ramp the power output to the high target power output is restored. FIG. 4 demonstrates the operation of the fuel cell system, under the control of the controller 501, when the fuel cell system connected to the power grid temporarily disconnects from the grid for a short period of time.

As shown in FIG. 4, in the first step S201, the fuel cell system is connected to the power grid, which allows the power output of the system to follow the power output set point, and is exporting power at a high level that is sufficient to satisfy the high target power output. The high power operation of the fuel cell system is disrupted when the fuel cell system disconnects from the power grid and a low load is determined in step S202. As mentioned above, the system may be caused to disconnect from the power grid due to grid disruption or one or more other factors such as failure of a fuel cell system component or process changes within the system. As discussed herein above with respect to FIGS. 2 and 3, when the controller of the system determines the instantaneous drop in the power output from the high load to the low load, the controller controls the input fuel flow rate and the input water flow rate in accordance with the power output set point at the low load until the system is reconnected with the power grid.

When the fuel cell system reconnects to the grid in step S203, the ability to ramp to a high target power output has been restored. However, as shown in FIG. 4, the system reconnects to the grid at the previous grid-independent power output at low load and thus the power output of the system must be increased or ramped until it is sufficient to satisfy the high target power output. If the fuel cell system was disconnected from the power grid for a short period of time, rapid load recovery procedure for rapid ramping of the power output of the system may be appropriate. Accordingly, when the fuel cell system is reconnected to the power grid and is prepared to ramp the power output in step S203, the operation proceeds to step S204 in which the controller determines whether the conditions for the rapid load recovery procedure are satisfied. These conditions include the maximum length of time elapsed since the disconnection of the system from the power grid, the minimum length of time elapsed since the completion of the previous rapid load recovery procedure, and the absence of any pre-selected power alarms being activated.

As discussed herein above with respect to FIG. 3, the controller in step S204 determines whether a predetermined time period equal to the first time period has elapsed since the time the system disconnected from the grid. In the illustrative embodiment described herein, the first predetermined time period is 15 minutes. If the first predetermined time period has elapsed, then the conditions for the rapid load recovery procedure have not been satisfied and the controller selects the standard load recovery procedure in S205, whereby the power output of the system is slowly and gradually increased in accordance with the power output set point until it satisfies the high target power output.

If the first predetermined time period has not yet elapsed, then the controller determines whether a second predetermined time period has elapsed since the completion of the previous rapid load recovery procedure. In the illustrative embodiment described herein, the second predetermined time period is 90 minutes. If the controller determines that the second predetermined time period has not elapsed, then the conditions for the rapid load recovery procedure have not been satisfied and rapid load recovery is disabled and the standard load recovery procedure is selected in step S205. If the controller determines that the second predetermined time period has passed, the controller then determines whether any pre-selected power alarms that would prevent rapid load recovery have been activated. If any such power alarms have been activated, then rapid load recovery is disabled and standard load recovery procedure is selected in S205. If the controller determines that no power alarms have been activated, then the conditions for the rapid load recovery procedure have been satisfied and the operation of the system proceeds to step S206 in which the rapid load recovery procedure is selected and performed.

As discussed above, the rapid load recovery procedure is performed by increasing the power output set point, and the power output of the fuel cell system at a significantly higher rate than during the standard load recovery procedure. In the present illustrative embodiment, the RLR rate at which the power output set point is increased during the rapid load recovery procedure is 50 kW/min, while the standard rate at which the power output set point is increased during the standard load recovery procedure is 0.5 kW/min. The power output of the system is increased in accordance with the power output set point by controlling the input fuel and input water flow rates, and during the rapid load recovery procedure the input fuel and water flow rates are controlled such that the carbon to steam ratio remains constant.

The rapid load recovery procedure described herein allows the fuel cell system to recover to high power output operation after a temporary drop from a high load to a low load and subsequent restoration of the ability to ramp to a high target power output at high load conditions in a significantly shorter time period than if the standard load recovery procedure is employed. The ability to quickly recover the high power output operation quickly, in turn, increases the efficiency and power production by the fuel cell system. In addition, because the rapid load recovery procedure is performed within a short time period from the time of the sudden drop in the load, the fuel cell system is not allowed to cool significantly, and the high rate at which the power output of the system is increased does not result in damage to the system components.

It should be noted that the controller 501 can be a conventional PLC (programmable logic controller—essentially highly reliable robust computer) made by GE. The control program used, in turn, can be a software product called "Versapro" again a GE product implementable in GE PLCs for industrial automation. In other embodiments, the controller can be a conventional DCS (distributed control system) manufactured by Foxboro, and the control program can be software implemented in the DCS for industrial automation, also manufactured by Foxboro. In yet another embodiment, the controller can be a conventional PLC-based "Iconics" system.

It is understood that the time periods and other conditions for the performance of the rapid load recovery are not limited to the conditions described herein. As mentioned above, the first and second predetermined time periods used by the controller in determining whether the rapid load recovery procedure should be employed may vary depending on the type and size of the fuel cell. Moreover, other conditions not specifically mentioned herein may be used in determining whether the rapid load recovery procedure should be employed.

In all cases it is understood that the above-described arrangements are merely illustrative of the many possible specific embodiments which represent applications of the present invention. Numerous and varied other arrangements can be readily devised in accordance with the principles of the present invention without departing from the spirit and the scope of the invention.

We claim:
1. A fuel cell system comprising:
a fuel cell;
a power load controller programmed to detect a change in a load and programmed to control a power output on the fuel cell system based on a power output set point;

wherein, when the power load controller determines, based on the detected change in the load that the load drops from a high load to a low load and the ability to ramp to a high target power output is thereafter restored, the controller is programmed to perform a rapid load recovery procedure by controlling the power output of said fuel cell system to increase from a power output corresponding to said low load to said high target power output corresponding to said high load at a first predetermined rate if all of one or more predetermined conditions in the fuel cell system are satisfied, and said controller is programmed to perform a standard load recovery procedure by controlling said power output to increase to the power output corresponding to said high target power output at a second predetermined rate if at least one of said one or more predetermined conditions in the fuel cell system is not satisfied, and wherein the high load is at least 10 kW greater than the low load, the drop from the high load to a low load is over a time period of 10 seconds or less, and said first predetermined rate is greater than said second predetermined rate.

2. A fuel cell system in accordance with claim 1, wherein:
said fuel cell system receives input fuel, input water and input oxidant;
said fuel cell system further comprises a humidifying assembly for combining the input fuel with the input water to produce humidified fuel; and
said fuel cell has an anode for receiving the humidified fuel and a cathode for receiving the input oxidant.

3. A fuel cell system for receiving input fuel and input oxidant in accordance with claim 2, wherein said controller controls said power output by controlling the flow rates of at least the input fuel and the input water, and wherein said controller is programmed to control the flow rates of said input fuel and the input water such that the carbon to steam ratio is constant during the performing of said rapid load recovery procedure.

4. A fuel cell system in accordance with claim 3, wherein said controller is programmed to control the flow rate of the input oxidant.

5. A fuel cell system in accordance with claim 1, wherein said one or more predetermined conditions include a first condition that a time period elapsed between the dropping of the load from a high load to a low load and the restoration of the ability to ramp to said high target power output is equal to or less than a first predetermined time period.

6. A fuel cell system in accordance with claim 5, wherein said one or more predetermined conditions further include a second condition that a time period elapsed since completion of a preceding rapid load recovery procedure is equal to or greater than a second predetermined time period.

7. A fuel cell system in accordance with claim 6, wherein said one or more predetermined conditions further include a third condition that no power alarms in said fuel cell system are activated.

8. A fuel cell system in accordance with claim 6, wherein said first predetermined time period is 15 minutes and said second predetermined time period is 90 minutes.

9. A fuel cell system in accordance with claim 8, wherein said first predetermined rate is 50 kW/min and said second predetermined rate is 0.5 kW/min.

10. A fuel cell system in accordance with claim 1, wherein said fuel cell system is connected to a power grid and said the controller is programmed to set the load.

11. A fuel cell system in accordance with claim 1, wherein said fuel cell system is independent of a power grid and said load is determined by one or more power consumption devices connected to said fuel cell system.

* * * * *